(12) United States Patent
Hu et al.

(10) Patent No.: US 10,659,260 B2
(45) Date of Patent: May 19, 2020

(54) DECISION FEEDBACK EQUALIZATION PROCESSING DEVICE AND METHOD

(71) Applicant: Montage LZ Semiconductor (Shanghai) Co., Ltd., Shanghai (CN)

(72) Inventors: Gang Hu, Shanghai (CN); Zhen Lu, Shanghai (CN); Xuepeng Wang, Shanghai (CN); Yuanfei Nie, Shanghai (CN)

(73) Assignee: MONTAGE LZ SEMICONDUCTOR (SHANGHAI) CO., Ltd., Shanghai (CN)

(*) Notice: Subject to any disclaimer, the term of this patent is extended or adjusted under 35 U.S.C. 154(b) by 0 days.

(21) Appl. No.: 16/538,849

(22) Filed: Aug. 13, 2019

(65) Prior Publication Data
US 2020/0052934 A1    Feb. 13, 2020

(30) Foreign Application Priority Data

Aug. 13, 2018  (CN) .......................... 2018 1 0915495

(51) Int. Cl.
*H03K 5/159*        (2006.01)
*H04L 25/03*        (2006.01)
(Continued)

(52) U.S. Cl.
CPC ...... *H04L 25/03057* (2013.01); *G06F 17/142* (2013.01); *G06F 17/16* (2013.01); *H04L 25/03885* (2013.01); *H04L 2025/0349* (2013.01)

(58) Field of Classification Search
CPC .......... H04L 25/03057; H04L 2/03885; H04L 2025/0349; G06F 17/42; G06F 17/16
(Continued)

(56) References Cited

U.S. PATENT DOCUMENTS

| 7,580,344 B1* | 8/2009 | Ojard ....................... H04B 3/32 |
| | | 370/201 |
| 2003/0081668 A1* | 5/2003 | Yousef ...................... H04L 1/06 |
| | | 375/232 |

(Continued)

*Primary Examiner* — Tesfaldet Bocure
(74) *Attorney, Agent, or Firm* — Jun He Law Offices P.C.; James J. Zhu

(57) ABSTRACT

The present application disclosed a decision feedback equalization processing device and method. The device comprises: a channel estimator for receiving an input signal, and determining, based on the input signal, an input signal autocorrelation matrix $R_{yy}$, an input-output signal cross-correlation matrix $R_{yx}$ and an input-output signal cross-correlation vector $r_{yx}$; a tap coefficient calculator for receiving $R_{yy}$, $R_{yx}$ and $r_{yx}$, and calculating a feed-forward equalizer (FFE) tap coefficient vector g and a feedback equalizer (FBE) tap coefficient vector f, wherein at least one of the FFE tap coefficient vector g and the FBE tap coefficient vector f is calculated using a conjugate gradient descent algorithm. The tap coefficient calculator comprises: a circulant matrix construction unit and a fast Fourier transformation (FFT) calculating unit. And the device further comprises a decision feedback equalizer for receiving from the tap coefficient calculator the FFE tap coefficient vector g and the FBE tap coefficient vector f, and performing equalization on the input signal and generating an equalized output signal.

14 Claims, 6 Drawing Sheets

(51) Int. Cl.
 *G06F 17/16* (2006.01)
 *G06F 17/14* (2006.01)
(58) Field of Classification Search
 USPC .................. 375/229, 233, 234; 333/18, 28 R
 See application file for complete search history.

(56) References Cited

U.S. PATENT DOCUMENTS

2012/0102082 A1\* 4/2012 Yoshimochi ...... H04L 25/03057
 708/323
2017/0104614 A1\* 4/2017 Ma ...................... H04L 25/0212

\* cited by examiner

DECISION FEEDBACK EQUALIZATION PROCESSING DEVICE AND METHOD

CROSS REFERENCE TO RELATED APPLICATIONS

The present application claims priority to Chinese Patent Application No. 201810915495.9 filed on Aug. 13, 2018, the content of which is incorporated herein in its entirety by reference.

FIELD OF THE INVENTION

The present application relates to communication technology, and more particularly to a decision feedback equalization processing device and method.

BACKGROUND

In high-speed digital communication, time-varying property and multi-path delays of wireless channels may cause severe inter symbol interferences (ISI). The ISI may lead to pulse broadening, rendering unstable voltage amplitudes of signals, increased bit error rates and so on. These are key factors that limit the improvement of signal speeds. A method to overcome the ISI is using equalization technologies in receivers. However, the conventional equalization technologies do not perform well and are complicated in computation.

Therefore, it is desired to provide an efficient channel equalization processing method.

SUMMARY

An objective of the present application is to provide a decision feedback equalization (DFE) processing device.

In an aspect of the present application, a DFE processing device comprises: a channel estimator for receiving an input signal, and determining, based on the input signal, an input signal autocorrelation matrix $R_{yy}$, an input-output signal cross-correlation matrix $R_{yx}$ and an input-output signal cross-correlation vector $r_{yx}$; a tap coefficient calculator for receiving from the channel estimator the input signal autocorrelation matrix $R_{yy}$, the input-output signal cross-correlation matrix $R_{yx}$ and the input-output signal cross-correlation vector $r_{yx}$, and calculating a feed-forward equalizer (FFE) tap coefficient vector g and a feedback equalizer (FBE) tap coefficient vector f based on the input signal autocorrelation matrix $R_{yy}$, the input-output signal cross-correlation matrix $R_{yx}$ and the input-output signal cross-correlation vector $r_{yx}$, wherein at least one of the FFE tap coefficient vector g and the FBE tap coefficient vector f is calculated using a conjugate gradient descent algorithm, and wherein the tap coefficient calculator comprises: a circulant matrix construction unit for constructing at least one of the input signal autocorrelation matrix $R_{yy}$, the input-output signal cross-correlation matrix $R_{yx}$ and a conjugate transposed matrix $R_{yx}^H$ of the input-output signal cross-correlation matrix $R_{yx}$ as a circulant matrix; and a fast Fourier transformation (FFT) calculating unit for multiplying the circulant matrix with an intermediate vector of the conjugate gradient descent algorithm using FFT during the calculation of the conjugate gradient descent algorithm; and a decision feedback equalizer for receiving from the tap coefficient calculator the FFE tap coefficient vector g and the FBE tap coefficient vector f, and performing equalization on the input signal based on the FFE tap coefficient vector g and the FBE tap coefficient vector f and generating an equalized output signal.

In another aspect of the present application, a decision feedback equalization (DFE) processing method comprises: receiving an input signal, and determining, based on the input signal, an input signal autocorrelation matrix $R_{yy}$, an input-output signal cross-correlation matrix $R_{yx}$ and an input-output signal cross-correlation vector $r_{yx}$; calculating a feed-forward equalizer (FFE) tap coefficient vector g and a feedback equalizer (FBE) tap coefficient vector f based on the input signal autocorrelation matrix $R_{yy}$, the input-output signal cross-correlation matrix $R_{yx}$ and the input-output signal cross-correlation vector $r_{yx}$, wherein at least one of the FFE tap coefficient vector g and the FBE tap coefficient vector f is calculated using a conjugate gradient descent algorithm, and wherein calculating using the conjugate gradient descent algorithm comprises: constructing at least one of the input signal autocorrelation matrix $R_{yy}$, the input-output signal cross-correlation matrix $R_{yx}$ and a conjugate transposed matrix $R_{yx}^H$ of the input-output signal cross-correlation matrix $R_{yx}$ as a circulant matrix; and multiplying the circulant matrix with an intermediate vector of the conjugate gradient descent algorithm using fast Fourier transformation (FFT); and providing the FFE tap coefficient vector g and the FBE tap coefficient vector f to a FFE and a FBE of a decision feedback equalizer to perform equalization on the input signal and generating an equalized output signal.

The above is a summary of the present application, and may be simplified, summarized, and omitted from the details. It is to be understood by those skilled in the art that the summary is only illustrative and not intended to limit the scope of the application in any way. The summary is not intended to identify key features or essential features of the claimed subject matter, and is not intended to be used as an aid in determining the scope of the claimed subject matter.

BRIEF DESCRIPTION OF THE DRAWINGS

The above and other features of the present application will be more fully understood from the following description and appended claims. It will be appreciated that these drawings depict only several embodiments of the present application, therefore not to be considered as limiting the scope of the present application. The content of the present application will be more clearly and in detail explained by the accompanying drawings.

DETAILED DESCRIPTION OF THE DRAWINGS

Figure 1:
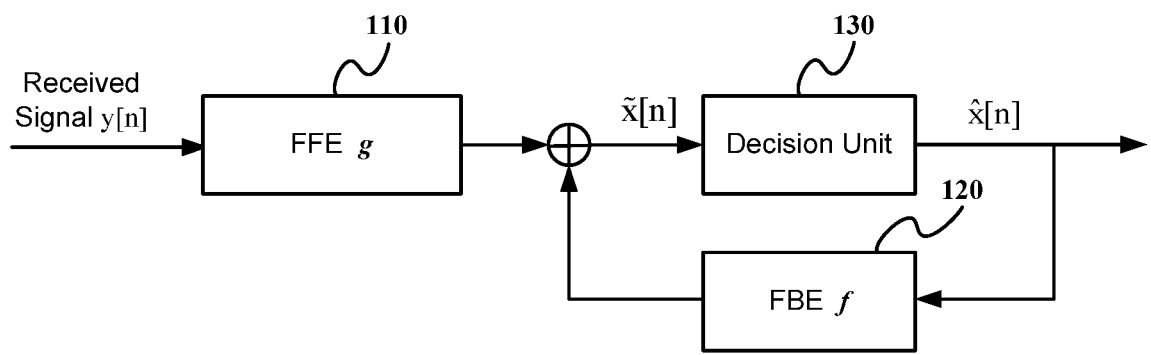
FIG. 1 illustrates a schematic diagram of a decision feedback equalizer according to an embodiment of the present application.

In the following detailed description, reference is made to the accompanying drawings that form a part thereof. In the drawings, like symbols generally indicate like components unless the context indicates otherwise. The illustrative embodiments described in the detailed description, drawings, and claims are not intended to be limiting. Other embodiments may be utilized, and other changes may be made, without departing from the spirit or scope of the subject matter of the application. It is to be understood that the various aspects of the subject matter of the present invention, which are generally described in the present application and illustrated in the accompanying drawings, can be configured, substituted, combined, and designed, all of which clearly constitute the content of the present application.

Transmission channels in communication systems are generally non-ideal, and the existence of factors including high-frequency losses, reflections, interferences, noises and etc. may deteriorate the quality of transmission signals. Digital signals transmitted via such transmission channels may extend in time domain and overlap with neighboring symbols, thereby forming inter-symbol interferences. Generally, a signal received at a receiver end can be expressed by Equation (1) below in time domain:

$$y[n] = h_0 x[n] + \sum_{\substack{i=-\infty \\ i \neq 0}}^{+\infty} h_i x[n-i] \qquad \text{Equation (1)}$$

wherein x[n] denotes a signal transmitted by a transmitter (TX), y[n] denotes the received signal received by the receiver (RX), n denotes n-th time period T, n is an integer; $h_0$ is a main component which indicates a maximum response; i is an integer, $h_i$ is called pre-cursor component when i is a negative value, which indicates interferences caused from symbols that have been transmitted; $h_i$ is called post-cursor component when i is a positive value, which indicates interferences caused from subsequently transmitted symbols.

The deterioration of the high-speed serial data signals due to interferences may increase difficulty for the receiver to decode data information contained in the received signals correctly. For example, due to the decreased voltage difference, the receiver may not be able to distinguish whether certain data bits in the received signals are a binary value 1 or 0. In order to compensate the deterioration, one or more equalizer circuits such as a decision feedback equalizer circuit can be used at the receiver end.

FIG. 1 illustrates a schematic diagram of a decision feedback equalizer (DFE) according to an embodiment of the present application. As illustrated in FIG. 1, the DFE includes a FFE 110, a FBE 120 and a decision unit 130.

The FFE 110 belongs to linear equalization technologies and is a type of finite impulse response (FIR) filter. The FFE 110 delays the received signal in unit of a symbol width or a fraction of the symbol width, and multiplies respective tap coefficients and adds the resulting weighted values together.

Figure 2:
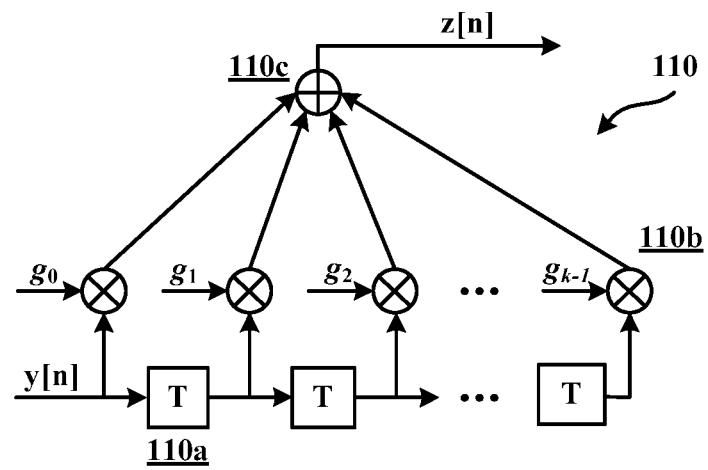
FIG. 2 illustrates a schematic diagram of a feedforward equalizer according to an embodiment of the present application.

FIG. 2 illustrates an exemplary FFE with a transversal filter structure. As illustrated in FIG. 2, the FFE 110 includes three basic elements: unit delay element 110a, multiplier 110b and adder 110c. $g_0, g_1, g_2 \ldots g_k-1$ denote the tap coefficients, wherein k denotes a number of the taps and T denotes a unit delay for each delay element. When an input signal y[i] is input into the FFE 110, an output signal of the FFE 110 can be expressed by equation (2) below.

$$z[n] = \sum_{i=0}^{k-1} g_i y[n-i] \qquad \text{Equation (2)}$$

Theoretically, as long as a FFE has enough taps, various types of linear transfer functions can be approximated to remove inter-symbol interferences including pre-cursor components contained in the received signal effectively.

Figure 3:
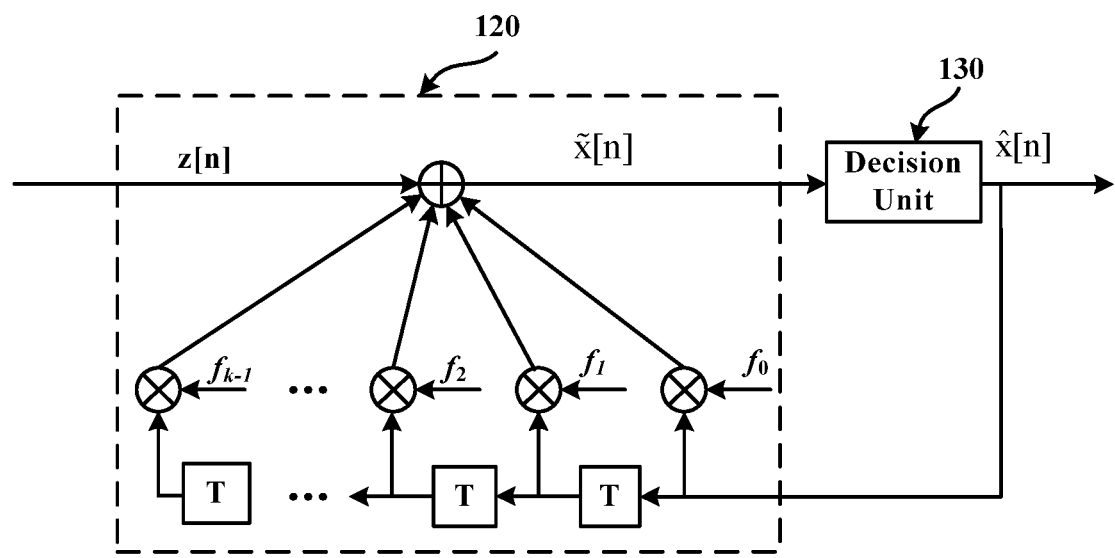
FIG. 3 illustrates a feedback equalizer according to an embodiment of the present application.

On the other hand, the FBE 120 and the decision unit 130 can effectively remove post-cursor components. FIG. 3 illustrates an exemplary schematic diagram of the FBE 120 and the decision unit 130, which have a structure corresponding to an infinite impulse response (IIR) filter. As illustrated in FIG. 3, the FBE 120 also uses a transversal filter structure. z[n] and x̃[n] denotes respective signals before and after the equalization by the FBE 120. x̂[n] denotes a signal decision signal obtained through the decision unit 130. $f_0, f_1, f_2 \ldots f_{k-1}$ denote tap coefficients of the FBE 120, wherein k denotes a number of the taps, and T denotes a unit delay for each delay element. The FBE 120 substrates from the currently received signal the weighted values of received and decided data to restore the received signal. The above process performed by the FBE 120 can be expressed by equation (3) below in time domain.

$$\tilde{x}[n] = z[n] - \sum_{i=0}^{k-1} f_i \hat{x}[n-i] \qquad \text{Equation (3)}$$

The decision unit 130 is used for symbol decision, which can quantize the output signal of the equalizer to fixed constellation points, thereby suppressing noise enhancement effect in the feedback loops and providing for stability of the loops through finite amplitude outputs.

Still referring to FIG. 1, a vector g denotes a tap coefficient vector of the FFE 110, for example, $g=[g_0, g_1, g_2, \ldots g_{k-1}]^H$ as shown in FIG. 2, which includes multiple tap coefficients. Another vector f denotes a tap coefficient vector of the FBE 120, for example, $f=[f_0, f_1, f_2, \ldots f_{k-1}]^H$ as shown in FIG. 3 which also includes multiple tap coefficients. y[n] denotes the received signal, x̃[n] denotes a sum of the output signals of the equalizer, and x̂[n] denotes an output signal of the decision unit. It should be noted that the number of the taps may affect the performance of the equalizer. Theoretically, a bigger number of taps can reduce more ISI. However, too much taps may make the circuit complicated and increase the difficulty in designing the circuit. In addition, with the increase of the number of the taps, interferences between the taps may deteriorate the performance of the equalizer. Thus, the number of the taps should be determined based on the specific application. As shown in FIG. 1, in order to equalize the received signal using the decision feedback equalizer, it is desired to determine in advance the tap coefficient vector g of the FFE 110 and the tap coefficient vector f of the FBE 120.

Generally, the tap coefficients of the decision feedback equalizer may be adjusted according to the change in the external communication channels. Methods for calculating the tap coefficients can be classified into an adaptive method and a direct calculation method. The adaptive method generally uses a training sequence to train signals to converge. The direct calculation method directly calculates the coefficients for the FFE and the FBE based on channel estimation results. When the training sequence has a limited length or the quality of the channel is terrible, the adaptive method generally cannot have the tap coefficients of the equalizer to converge, therefore the eye diagram cannot be fully opened. The direct calculation method can obtain the tap coefficients of the equalizer directly and thus have significant advantage over the adaptive method. However, it is very complicated to calculate the tap coefficients of the equalizer using the conventional direct calculation method. The computational complexity is in proportion to a cube of an order of the equalizer, i.e. $O(N^3)$, wherein N denotes the order of the equalizer which is corresponding to the number of taps of the equalizer. Taking a 64-order equalizer as an example, the conventional method requires several hundred thousands of multiplying operations, which significantly limits the application of such method.

In order to reduce the complexity for calculating the tap coefficients of equalizers, there is provided a decision feedback equalization (DFE) processing device and method according to embodiments of the present application. When calculating the tap coefficients of the equalizers, it is fully taken into account the characteristics of channel convolution matrix and the structure of the decision feedback equalizer, which reduces the complexity for calculating the tap coefficients of equalizers from $O(N^3)$ to $O(k \times N \times \log 2(N))$, wherein k is a number of the iteration calculation which is generally defined as k<5 at the beginning of the calculation, and N is an order of the equalizer. Still taking the 64-order equalizer as an example, the computational complexity is reduced to several thousands of multiplying operations, which can be further reduced if the system is under a continuous working mode where k=1 or k=2. In the following the DFE processing device and method according to embodiments of the present application will be elaborated with reference to the drawings.

Figure 4:
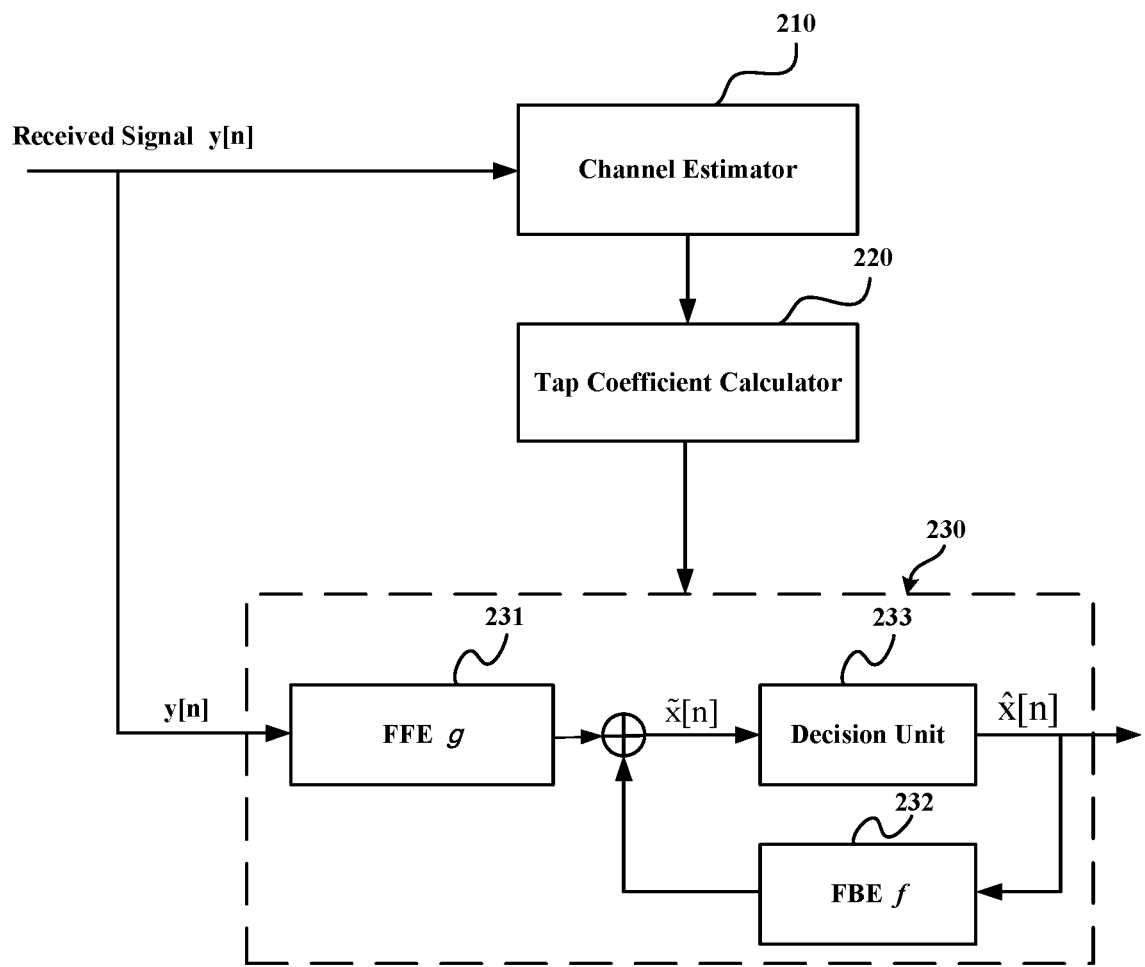
FIG. 4 illustrates a decision feedback equalization processing device according to an embodiment of the present application.

With reference to FIG. 4, a schematic diagram of the DFE processing device according to an embodiment of the present application is illustrated. As shown in FIG. 4, the DFE processing device includes a channel estimator 210, a tap coefficient calculator 220 and a decision feedback equalizer 230, wherein the decision feedback equalizer 230 further includes a FFE 231, a FBE 232 and a decision unit 233. The details of the FFE 231, the FBE 232 and the decision unit 233 can be referred to the exemplary descriptions with reference to FIGS. 1 to 3, which will not be elaborated herein. It should be noted that the decision feedback equalizer 230 may use any other structures known to a person skilled in the art.

The channel estimator 210 is used to estimate a channel impulse response according to a received signal and a training sequence. The training sequence is a sequence known to the transmitter and the receiver which therefore can be used for estimating the channel information in combination with the received signal. In some embodiments, the training sequence can be inserted into data packets to be transmitted. Since the training sequence and the data packet signals will experience the same channel characteristics, the channel information can be estimated at the receiver end according to a received signal generated from a known transmitted signal via the channel. For example, the training sequence portion received at the receiver end can be processed with algorithms such as minimum variance criterion, simplified minimum variance criterion, mixed minimum variance criterion, minimum mean square error criterion or maximum likelihood criterion, etc., to obtain an estimation function of the channel impulse response which can be used for estimating the channel information effectively. In some other embodiments, the channel estimator 210 may obtain estimated values corresponding to the channels using other suitable methods based on the application scenario. After the channel estimator 210 obtaining the estimated value of the channel impulse response, for the decision feedback equalizer 230, an autocorrelation matrix $R_{yy}$ of an input signal y[n], a cross-correlation matrix $R_{yx}$ between the input signal y[n] and the output signal x̂[n], and a cross-correlation vector $r_{yx}$ between the input signal y[n] and the output signal x̂[n] can be obtained. The calculation methods for calculating the autocorrelation matrix $R_{yy}$, the cross-correlation matrix $R_{yx}$ and the cross-correlation vector $r_{yx}$ can be referred to conventional methods which will not be elaborated herein.

The tap coefficient calculator 220 is used to calculate a tap coefficient vector g of a FFE 231 of the decision feedback equalizer 230 and a tap coefficient vector f of a FBE 232 of the decision feedback equalizer 230 based on the input signal autocorrelation matrix $R_{yy}$, the input-output signal cross-correlation matrix $R_{yx}$ and the input-output signal cross-correlation vector $r_{yx}$. Specifically, a mean square error $\zeta(g, f)$ generated by the decision feedback equalizer 230 based on the input signal can be defined by the following equation.

$$\zeta(g,f)=E\{|x[n-v]-\hat{x}[n]|^2\} \quad \text{Equation (4)}$$

Wherein x[n] denotes a signal transmitted by the transmitter, x̂[n] denotes an output signal of the decision unit 233, v denotes a delay of the signal passing the decision feedback equalizer 230, that is, a current output signal of the decision feedback equalizer 230 corresponds to an input signal x[n−v] which is v periods earlier; operator E denotes the estimation operation.

In the tap coefficient calculator 220, the tap coefficient vectors g and f of the decision feedback equalizer 230 can be obtained according to the minimum mean square error (MMSE) criterion as below.

$$(g, f) = \arg\min_{(g,f)} \zeta(g, f) \quad \text{Equation (5)}$$
$$= \arg\min_{(g,f)}\{\sigma_x^2 - 2\text{Re}\{g^H r_{yx}\} + g^H R_{yy} g + 2\text{Re}\{g^H R_{yx} f\} + \sigma_x^2 f^H f\}$$

Wherein arg min denotes the values of the coefficients g and f when the function $\zeta(g,f)$ reaches its minimum value, $\sigma_x^2$ denotes the square error of the input signal, and Re denotes taking real part operation.

The solution of Equation (5) above can be expressed as below.

$$g=(R_{yy}-R_{yx}R_{yx}^H)^{-1}r_{yx} \quad \text{Equation (6)}$$

$$f=-R_{yx}^H g \quad \text{Equation (7)}$$

Wherein $R_{yy}$ denotes the input signal autocorrelation matrix, $R_{yx}$ denotes the input-output signal cross-correlation matrix and $r_{yx}$ denotes the input-output signal cross-correlation vector, which can be obtained by the channel estimator 210. Due to the non-sparsity of the matrix $R_{yy}-R_{yx}R_{yx}^H$, the complexity for implementing a matrix inversion operation to calculate g and f is about $O(N^3)$, wherein N is an order of the matrix, i.e. an order number of the equalizer.

Solving Equation (6) to obtain g is equivalent to solving a linear equation below.

$$(R_{yy}-R_{yx}R_{yx}^H)g=r_{yx} \quad \text{Equation (8)}$$

Based on the positive definiteness and symmetry of the matrix $R_{yy}-R_{yx}R_{yx}^H$, g can be iteratively solved using a conjugate gradient descent algorithm. Moreover, based on the study of channel characteristics, the channel can be regarded as non-time varying during a short period and the signals transmitted at different times are independent from each other. Under these two assumptions, the correlation matrices $R_{yy}$ and $R_{yx}$ calculated based on the above description has quasi-cyclic mathematical characteristics. Due to the quasi-cyclic characteristics of the matrices $R_{yy}$ and $R_{yx}$, the tap coefficient calculator 220 can implement calculation by constructing circulant matrices and performing the multiplying operations on the matrices $R_{yy}$ and $R_{yx}$ and an intermediate vector of the conjugate gradient descent algorithm using fast Fourier transformation (FFT). With such processing, the computational complexity for solving the above Equation (8) can be reduced from $O(N^3)$ to $O(k \times N \times \log 2(N))$, wherein N denotes the order of the matrix, and k denotes the iteration number of the conjugate gradient descent algorithm. k can generally be defined as k<5 at the beginning of the calculation, and can be defined as k=1 or k=2 if the system is under a continuous working mode.

Figure 5:
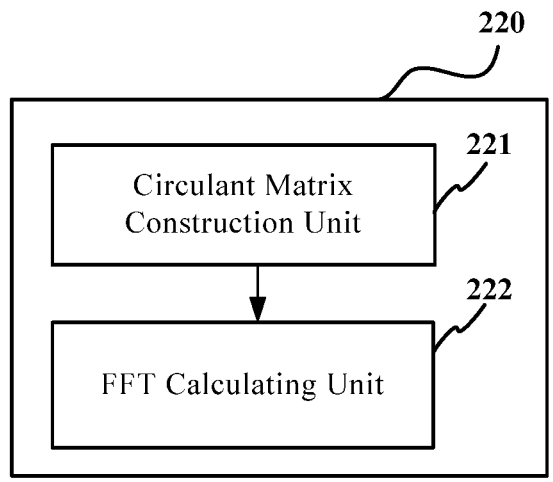
FIG. 5 further illustrates a schematic diagram of a tap coefficient calculator shown in FIG. 4.

With reference to FIG. 5, a schematic diagram of the tap coefficient calculator 220 according to an embodiment of the present application is illustrated. The tap coefficient calculator 220 includes a circulant matrix construction unit 221 and a FFT calculation unit 222. The process for solving the tap coefficient vector g by the tap coefficient calculator 220 using the conjugate gradient descent algorithm is as below with reference to FIG. 5.

(1) initializing a solution $g_0=r_{yx}$, a search direction vector $p_0=r_{yx}$ and a residual vector $r_0=r_{yx}$, and repeating the following steps (2) to (9); wherein a loop variable i=0, 1, 2, ..., k−1, and k is a maximum iteration number for the conjugate gradient descent algorithm;

(2) constructing with the circulant construction unit 221 a circulant matrix for the input signal autocorrelation matrix $R_{yy}$, and calculating with the FFT calculating unit 222 $W_1=R_{yy}p_i$;

(3) constructing with the circulant construction unit 221 a circulant matrix for the conjugate transposed matrix $R_{yx}^H$ of the input-output signal cross-correlation matrix $R_{yx}$, and calculating with the FFT calculating unit 222 $W_2=R_{yx}^H p_i$;

(4) constructing with the circulant construction unit 221 a circulant matrix for input-output signal cross-correlation matrix $R_{yx}$, and calculating with the FFT calculating unit 222 $W_3=R_{yx}W_2$;

(5) calculating $W=W_1-W_3$;

(6) calculating $A=W^H p_i$, wherein $W^H$ is a conjugate transposed matrix of W;

(7) updating a solution $g_{i+1}=g_i+\alpha^* p_i$, wherein a scalar value $$\alpha = \begin{cases} 0, & |A| < thr \\ \dfrac{r_i^H r_i}{A}, & |A| \geq thr \end{cases}$$

and thr: denotes a predetermined threshold value;

(8) caching the residual vector $t_i=r_i$, and updating the residual vector $r_{i+1}=r_i-\alpha^* W$; and (9) updating the search direction vector $p_{i+1}=r_{i+1}+\beta^* p_i$, wherein a scalar value, $$\beta = \begin{cases} 0, & |t_i| < thr \\ \dfrac{r_{i+1}^H r_{i+1}}{t_i^H t_i}, & |t_i| \geq thr \end{cases}.$$

In some embodiments, the predetermined threshold value thr: in step (7) may be $10^{-6}$. The intermediate vector of the conjugate gradient descent algorithm is the search direction vector.

An optimized tap coefficient vector $g_{k-1}$ can be obtained using the above conjugate gradient descent algorithm, which can be used as the tap coefficient vector g of the FFE 231. Moreover, the tap coefficient vector f of the FBE 232 can be directly calculated based on the tap coefficient vector g of the FFE 231 using Equation (7).

As can be seen from the steps (2), (3) and (4) of the above calculation that FFT technology is heavily used to reduce the complexity for solving the equations. In order to further describe the circulant matrix construction unit 221 constructing the circulant matrix, the FFT calculating unit 222 performing the multiplying operations on the circulant matrix and the intermediate vector of the conjugate gradient descent algorithm, the embodiment of the present application is elaborated by taking the step (2) as an example wherein i=0.

After the receiver end obtains an estimated value of the channel response with the channel estimator 210, inputs desired by calculating the tap coefficients are obtained, i.e. the input signal autocorrelation matrix $R_{yy}$, the input-output signal cross-correlation matrix $R_{yx}$ and the input-output signal cross-correlation vector $r_{yx}$. For example, assuming that $$R_{yy} = \begin{bmatrix} 1.7094 & -0.0957-0.092i \\ -0.0957+0.092i & 1.7094 \end{bmatrix}$$

$$R_{yx} = \begin{bmatrix} 0.069 & -0.414 \\ 0 & 0.069 \end{bmatrix}$$

$$r_{yx} = \begin{bmatrix} -0.414 \\ 0 \end{bmatrix};$$

And the tap coefficient calculator 220 initializes the search direction vector $$p_0 = r_{yx} = \begin{bmatrix} -0.414 \\ 0 \end{bmatrix}.$$

Specifically, in the step (2) that the tap coefficient calculator 220 solves the tap coefficient vector g iteratively using the conjugate gradient descent algorithm, first the circulant matrix construction unit 221 constructs a circulant matrix $R_c$ based on $R_{yy}$:

$$R_c = \begin{bmatrix} 1.0794 & -0.097-0.0925i & 0 & -0.097+0.0925i \\ -0.097+0.0925i & 1.0794 & -0.097-0.0925i & 0 \\ 0 & -0.097+0.0925i & 1.0794 & -0.097-0.0925i \\ -0.097-0.0925i & 0 & -0.097+0.0925i & 1.0794 \end{bmatrix},$$

each unit of a row vector of the above matrix is a result of each element of a previous row vector moving rightward sequentially, and the circulant matrix construction unit 221 constructs an extended column vector $p_{ext}$ based on $p_0$:

$$p_{ext} = \begin{bmatrix} -0.414 \\ 0 \\ 0 \\ 0 \end{bmatrix}$$

Wherein the extended column vector $p_{ext}$ is generated by padding zeros to $p_0$, such that the order of the extend column vector $p_{ext}$ increases from an order of the input signal autocorrelation matrix $R_{yy}$ to an order to the circulant matrix $R_c$. In the above example, the order of the extend column vector $p_{ext}$ increases from 2 to 4. In other words, the order of the extended column vector $p_{ext}$ corresponds to the order of the circulant matrix $R_c$. And then the FFT calculating unit 222 calculates the FFT transformation $F_R$ and $F_{p_{ext}}$ of a first column vector of $R_c$ and $p_{ext}$, respectively, and calculates a dot product S of $F_R$ and $F_{p_{ext}}$:

$$F_R = \begin{bmatrix} 0.8879 \\ 1.2644 \\ 1.2709 \\ 0.8945 \end{bmatrix}$$

$$F_{p_{ext}} = \begin{bmatrix} -0.414 \\ -0.414 \\ -0.414 \\ -0.414 \end{bmatrix}$$

$$S = F_R \cdot F_{p_{ext}}$$
$$= \begin{bmatrix} 0.8879 \\ 1.2644 \\ 1.2709 \\ 0.8945 \end{bmatrix} \cdot \begin{bmatrix} -0.414 \\ -0.414 \\ -0.414 \\ -0.414 \end{bmatrix}$$
$$= \begin{bmatrix} -0.3676 \\ -0.5235 \\ -0.5262 \\ -0.3704 \end{bmatrix}$$

Next, the FFT calculating unit 222 performs inverse fast Fourier transformation (IFFT) on S and selects the first two components of IFFT(S) to assign the result of $R_{yy}p_1$ to $W_1$.

$$s = IFFT(S)$$
$$= IFFT\left\{ \begin{bmatrix} -0.3676 \\ -0.5235 \\ -0.5262 \\ -0.3704 \end{bmatrix} \right\}$$
$$= \begin{bmatrix} -0.4469 \\ 0.0396-0.0383i \\ 0 \\ 0.0396+0.038i \end{bmatrix}$$

$$W_1 = \begin{bmatrix} -0.4469 \\ 0.0396-0.0383i \end{bmatrix}$$

Accordingly, a product of the circulant matrix of the input signal autocorrelation matrix $R_{yy}$ and the extended column vector $p_{ext}$ of the intermediate vector (including multiple values) $p_i$ of the conjugate gradient descent algorithm is calculated using FFT, and the value of $W_1$ in the step (2) of the above conjugate gradient descent algorithm is obtained. Similarly, the values of $W_2$ and $W_3$ in steps (3) and (4) can be obtained, by calculating a product of the circulant matrix of the conjugate transposed matrix $R_{yx}^H$ of the input-output signal cross-correlation matrix $R_{yx}$ and the extended column vector of the intermediate vector $p_i$ of the conjugate gradient descent algorithm, and a product of the circulant matrix of the input-output signal cross-correlation matrix $R_{yx}$ and the extended column vector of the intermediate vector (including multiple values) $W_2$ of the conjugate gradient descent algorithm using FFT. It should be noted that when the circulant matrix construction unit 221 constructs the circulant matrix $R_c$ based on $R_{yy}$, and constructs the extended column vector $p_{ext}$ based on $p_0$, the order of the circulant matrix $R_c$ and the order of the vector $p_{ext}$ is not unique and can vary depending on different application scenarios. In addition, in order to reduce the computation by the FFT calculating unit 222, the circulant matrix construction unit 221 can fill 0 at positions of the circulant matrix $R_c$ and the vector $p_{ext}$ where elements are needed to be filled. The methods for constructing circulant matrices based on matrices $R_{yx}$ and $R_{yx}^H$ in steps (3) and (4) of the above conjugate gradient descent algorithm are similar and not elaborated herein. Moreover, the orders of the matrices and vectors in the above example are selected to be small values, however in real application, the orders of the matrices and vectors may be significantly bigger than the above exemplary values, for example, which can be 32, 64 or 128.

In the above embodiments, in the steps (2), (3) and (4) of the conjugate gradient descent algorithm, circulant matrices are constructed for the input signal autocorrelation matrix $R_{yy}$, the input-output signal cross-correlation matrix $R_{yx}$ and the conjugate transposed matrix $R_{yx}^H$ of the input-output signal cross-correlation matrix $R_{yx}$ for the channel estimator to implement multiplying operations. In some other embodiments, one or two of the three matrices can be selected for constructing circulant matrices to implement multiplying operations, thereby reducing the computational complexity.

It should be noted that in the above embodiments, solving Equation (5) can obtain Equations (6) and (7), i.e. the FFE tap coefficient vector g represented by $R_{yy}$, $R_{yx}$, $R_{yx}^H$ and $r_{yx}$, and the FEB tap coefficient vector f represented by g and $R_{yx}^H$. It can be appreciated by those skilled in the art, in some other embodiments, after solving Equation (5), the FBE tap coefficient vector f represented by $R_{yy}$, $R_{yx}$, $R_{yx}^H$ and $r_{yx}$ can be obtained, as well the FFE tap coefficient vector g represented by f and a known value. Afterwards, f can be solved using the conjugate gradient descent algorithm first, and g can be solved using the solved f. However, the latter calculation may increase computation operations. In some other embodiments, Equation (5) can be solved to obtain the FFE tap coefficient vector g and the FEB tap coefficient vector f both represented by $R_{yy}$, $R_{yx}$, $R_{yx}^H$ and $r_{yx}$, which, however, may increase the computation operations.

Figure 6:
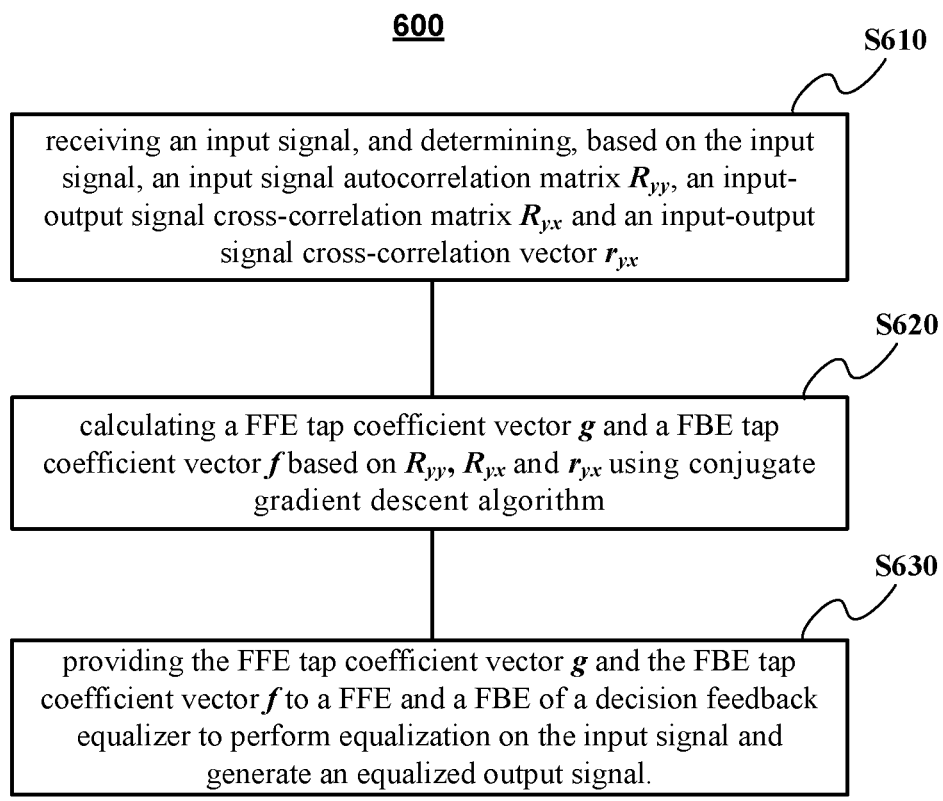
FIG. 6 illustrates a flow chart of a decision feedback equalization processing device according to an embodiment of the present application.

Accordingly, according to some other embodiments of the present application, there is provided a DFE processing method which can use the above tap coefficient calculating method to calculate equalization coefficients of the equalizer. As illustrated in FIG. 6, the DFE processing method includes:

Step S610, receiving an input signal, and determining, based on the input signal, an input signal autocorrelation matrix $R_{yy}$, an input-output signal cross-correlation matrix $R_{yx}$ and an input-output signal cross-correlation vector $r_{yx}$.

Step S620, calculating a FFE tap coefficient vector g and a FBE tap coefficient vector f based on the input signal autocorrelation matrix $R_{yy}$, the input-output signal cross-correlation matrix $R_{yx}$ and the input-output signal cross-correlation vector $r_{yx}$, wherein at least one of the FFE tap coefficient vector g and the FBE tap coefficient vector f is calculated using a conjugate gradient descent algorithm, and wherein calculating using the conjugate gradient descent algorithm comprises: constructing at least one of the input signal autocorrelation matrix $R_{yy}$, the input-output signal cross-correlation matrix $R_{yx}$ and a conjugate transposed matrix $R_{yx}^H$ of the input-output signal cross-correlation matrix $R_{yx}$ as a circulant matrix; and multiplying the circulant matrix with an intermediate vector of the conjugate gradient descent algorithm using FFT; and Step S630, providing the FFE tap coefficient vector g and the FBE tap coefficient vector f to a FFE and a FBE of a decision feedback equalizer to perform equalization on the input signal and generate an equalized output signal.

The details of the channel equalization processing method can be referred to the descriptions of the channel equalization processing device with reference to FIGS. 1 to 5, which will not elaborated herein.

Figure 7A:
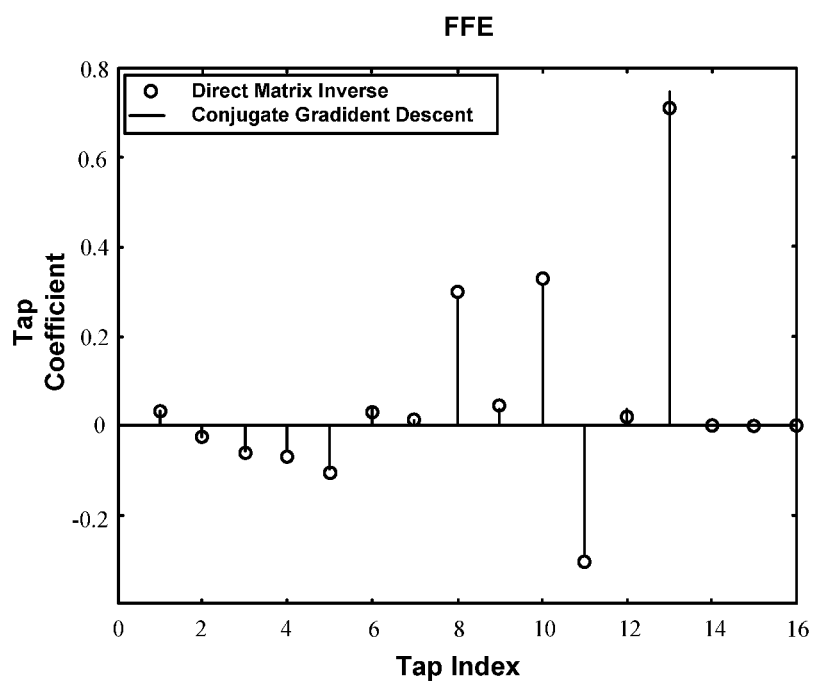
FIG. 7a illustrates a comparison between FFE tap coefficients obtained using a decision feedback equalization processing method of the present application and FFE tap coefficients obtained using a direct matrix inversion method.
Figure 7B:
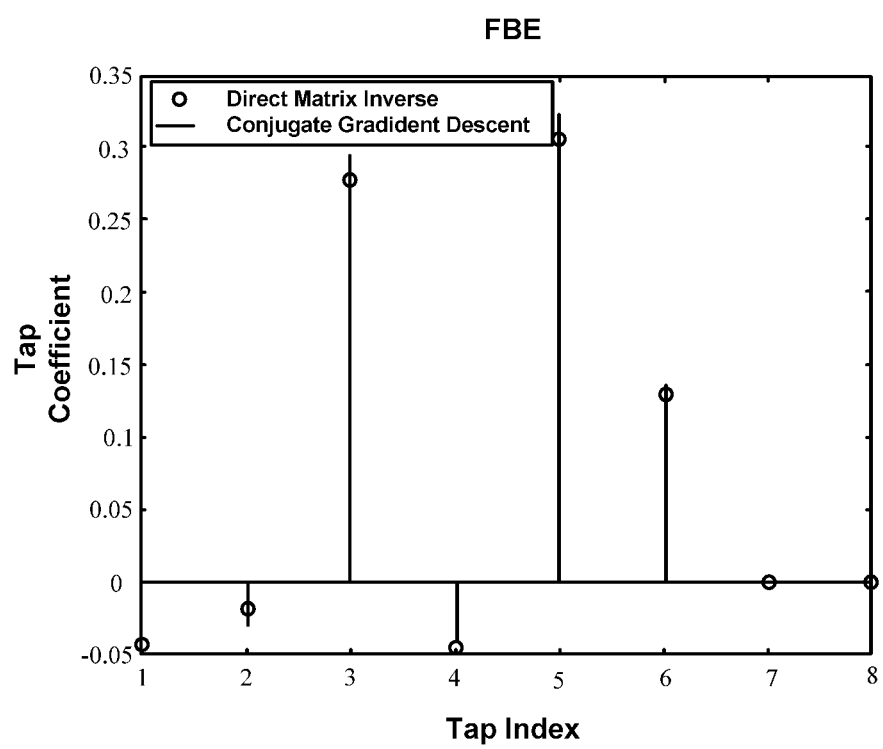
FIG. 7b illustrates a comparison between FBE tap coefficients obtained using a decision feedback equalization processing method of the present application and FBE tap coefficients obtained using a direct matrix inversion method.

FIG. 7a illustrates a comparison between a FFE tap coefficient obtained using a decision feedback equalization processing method of the present application and FFE tap coefficients obtained using a direct matrix inversion method, for a 16-tap FFE. FIG. 7b illustrates a comparison between FFE tap coefficients obtained using a decision feedback equalization processing method of the present application and FFE tap coefficients obtained using a direct matrix inversion method, for a 8-tap FFE. As can be seen from the figures, the tap coefficients obtained using the decision feedback equalization processing method of the present application are substantially the same as those obtained using the direct matrix inversion method. However, the decision feedback equalization processing method of the present application reduces the computational complexity from $O(N^3)$ to $O(k \times N \times \log 2(N))$, which significantly improves the efficiency.

It should note that the decision feedback equalization processing device according to the embodiments of the present application can be implemented as one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic devices. Moreover, the disclosed devices can be implemented by other means. For example the exemplary devices described above are illustrative, and the division of units is merely based on logic functions, which may be implemented in other manners in practice. For example, multiple units or components can be combined or integrated within another system, or some features can be ignored or can be non-executed. Also, the illustrated coupling or direct coupling or communicative coupling between components or units can be implemented through some interfaces, and indirect coupling or communicative connection between devices or units can be electronic or in other manners. The units shown as discrete components may be or may not be separate physically, and the components shown as units may be or may not be physical units, i.e. they can be arranged in a single position or distributed to multiple network units. A portion of all of the units can be selected to implement the embodiments of the present application according to actual needs.

In addition, the functional units of the embodiments of the present application can be implemented in form of hardware of software functional units. When the functional units are implemented as software functional units and sold or used as separate products, they can be stored in a computer readable storage medium. Based on such understanding, the technical solution or a contribution to the prior art of the present application or a part or all of the technical solution can be embodied in a software product which can be stored in a storage medium and include instructions executable by a computing device (e.g. a personal computer, a mobile terminal, a server or a network device, etc.) to perform a portion or all of the steps of the method according to the embodiments of the present application.

Other variations to the disclosed embodiments can be understood and implemented by those skilled in the art by studying the specification, drawings and accompanying drawing. In the claims, wording "include" does not exclude other elements and steps, and wordings "a" and "one" do not exclude plural. In the practical application of the present application, an element may perform the functions of a plurality of technical features cited in the claims. Any reference markers in the claims should not be construed as limiting the scope.

What is claimed is:

1. A decision feedback equalization (DFE) processing device comprising:
    a channel estimator for receiving an input signal, and determining, based on the input signal, an input signal autocorrelation matrix $R_{yy}$, an input-output signal cross-correlation matrix $R_{yx}$ and an input-output signal cross-correlation vector $r_{yx}$;
    a tap coefficient calculator for receiving from the channel estimator the input signal autocorrelation matrix $R_{yy}$, the input-output signal cross-correlation matrix $R_{yx}$ and the input-output signal cross-correlation vector $r_{yx}$, and calculating a feed-forward equalizer (FFE) tap coefficient vector g and a feedback equalizer (FBE) tap coefficient vector f based on the input signal autocorrelation matrix $R_{yy}$, the input-output signal cross-correlation matrix $R_{yx}$ and the input-output signal cross-correlation vector $r_{yx}$, wherein at least one of the FFE tap coefficient vector g and the FBE tap coefficient vector f is calculated using a conjugate gradient descent algorithm, and wherein the tap coefficient calculator comprises:

a circulant matrix construction unit for constructing at least one of the input signal autocorrelation matrix $R_{yy}$, the input-output signal cross-correlation matrix $R_{yx}$ and a conjugate transposed matrix $R_{yx}^H$ of the input-output signal cross-correlation matrix $R_{yx}$ as a circulant matrix; and a fast Fourier transformation (FFT) calculating unit for multiplying the circulant matrix with an intermediate vector of the conjugate gradient descent algorithm using FFT during the calculation of the conjugate gradient descent algorithm; and a decision feedback equalizer for receiving from the tap coefficient calculator the FFE tap coefficient vector g and the FBE tap coefficient vector f, and performing equalization on the input signal based on the FFE tap coefficient vector g and the FBE tap coefficient vector f and generating an equalized output signal.

2. The DEF processing device of claim 1, wherein the decision feedback equalizer comprises a FFE, a FBE and a decision unit, wherein
the FFE is configured to receive the input signal and perform feed-forward equalization on the input signal based on the FFE tap coefficient vector g;
the FBE is configured to receive an output signal of the decision unit and perform feedback equalization on the output signal of the decision unit based on the FBE tap coefficient vector f; and
the decision unit is configured to perform decision on a sum of output signals of the FFE and the FBE to generate the output signal of the decision unit.

3. The DFE processing device of claim 1, wherein the input signal comprises a training sequence, and the channel estimator is configured to determine the input signal autocorrelation matrix $R_{yy}$, the input-output signal cross-correlation matrix $R_{yx}$ and the input-output signal cross-correlation vector $r_{yx}$ based on the training sequence.

4. The DFE processing device of claim 1, wherein the tap coefficient calculator is configured to calculate the FFE tap coefficient vector g by solving an equation $(R_{yy}-R_{yx}R_{yx}^H)g=r_{yx}$ using the conjugate gradient descent algorithm.

5. The DFE processing device of claim 4, wherein calculating the FFE tap coefficient vector g by solving an equation $(R_{yy}-R_{yx}R_{yx}^H)g=r_{yx}$ using the conjugate gradient descent algorithm comprises:

(1) initializing a solution $g_0=r_{yx}$, a search direction vector $p_0=r_{yx}$ and a residual vector $r_0=y_{rx}$, and repeating the following steps (2) to (7); wherein a loop variable i=0, 1, 2, ..., k−1, and k is a maximum iteration number for the conjugate gradient descent algorithm;

(2) calculating $W_1=R_{yy}p_i$, $W_2=R_{yx}^H p_i$ and $W_3=R_{yx}W_2$; wherein during the calculation, the circulant matrix construction unit constructs a circulant matrix for at least one of the input signal autocorrelation matrix $R_{yy}$, the input-output signal cross-correlation matrix $R_{yx}$ and the conjugate transposed matrix $R_{yx}^H$ of the input-output signal cross-correlation matrix $R_{yx}$, and constructs an extended column vector for at least one of $p_i$ and $W_2$ corresponding to the circulant matrix; and wherein the FFT calculating unit performs multiplying operation on the circulant matrix and the extended column vector using FFT;

(3) calculating $W=W_1-W_3$;

(4) calculating $A=W^H p_i$, wherein $W^H$ is a conjugate transposed matrix of W;

(5) updating a solution $g_{i+1}=g_i+\alpha^* p_i$, wherein a scalar value $$\alpha = \begin{cases} 0, & |A| < thr \\ \dfrac{r_i^H r_i}{A}, & |A| \geq thr \end{cases}$$

and thr: denotes a predetermined threshold value;

(6) caching the residual vector $t_i=r_i$, and updating the residual vector $r_{i+1}=r_i-\alpha^* W$; and (7) updating the search direction vector $p_{i+1}=r_{i+1}+\beta^* p_i$, wherein a scalar value $$\beta = \begin{cases} 0, & |t_i| < thr \\ \dfrac{r_{i+1}^H r_{i+1}}{t_i^H t_i}, & |t_i| \geq thr \end{cases}.$$

6. The DFE processing device of claim 5, wherein the FFT calculating unit performs multiplying operation on the circulant matrix and the extended column vector by:
dot multiplying a first column of the circulant matrix with the extended column vector after they are transformed using FFT; and
performing inverse FFT (IFFT) on a multiplying result of the dot multiplying and determining a result of the multiplying operation based on a transformed result of the IFFT.

7. The DFE processing device of claim 4, wherein the tap coefficient calculator calculates the FBE tap coefficient vector f by solving an equation $f=-R_{yx}^H g$ based on the FFE tap coefficient vector g and the conjugate transposed matrix $R_{yx}^H$ of the input-output signal cross-correlation matrix $R_{yx}$.

8. A decision feedback equalization (DFE) processing method, comprising:
receiving an input signal, and determining, based on the input signal, an input signal autocorrelation matrix $R_{yy}$, an input-output signal cross-correlation matrix $R_{yx}$ and an input-output signal cross-correlation vector $r_{yx}$;
calculating a feed-forward equalizer (FFE) tap coefficient vector g and a feedback equalizer (FBE) tap coefficient vector f based on the input signal autocorrelation matrix $R_{yy}$, the input-output signal cross-correlation matrix $R_{yx}$ and the input-output signal cross-correlation vector $r_{yx}$, wherein at least one of the FFE tap coefficient vector g and the FBE tap coefficient vector f is calculated using a conjugate gradient descent algorithm, and wherein calculating using the conjugate gradient descent algorithm comprises:
constructing at least one of the input signal autocorrelation matrix $R_{yy}$, the input-output signal cross-correlation matrix $R_{yx}$ and a conjugate transposed matrix $R_{yx}^H$ of the input-output signal cross-correlation matrix $R_{yx}$ as a circulant matrix; and
multiplying the circulant matrix with an intermediate vector of the conjugate gradient descent algorithm using fast Fourier transformation (FFT); and providing the FFE tap coefficient vector g and the FBE tap coefficient vector f to a FFE and a FBE of a decision feedback equalizer to perform equalization on the input signal and generating an equalized output signal.

9. The DFE processing method of claim 8, wherein providing the FFE tap coefficient vector g and the FBE tap coefficient vector f to a FFE and a FBE of a decision feedback equalizer to perform equalization on the input signal and generate an equalized output signal comprising:
performing feed-forward equalization on the input signal based on the FFE tap coefficient vector g; and
performing feedback equalization on a feedback input signal based on the FBE tap coefficient vector f; and
performing decision on a sum of the feed-forward equalized signal and the feedback equalized signal to generate the output signal.

10. The DFE processing method of claim 8, wherein the input signal comprises a training sequence, and the input signal autocorrelation matrix $R_{yy}$, the input-output signal cross-correlation matrix $R_{yx}$ and the input-output signal cross-correlation vector $r_{yx}$ are determined based on the training sequence.

11. The DFE processing method of claim 8, wherein calculating a FFE tap coefficient vector g and a FBE tap coefficient vector f based on the input signal autocorrelation matrix $R_{yy}$, the input-output signal cross-correlation matrix $R_{yx}$ and the input-output signal cross-correlation vector $r_{yx}$ comprises:
calculating the FFE tap coefficient vector g by solving an equation $(R_{yy}-R_{yx}R_{yx}^{H})g=r_{yx}$ using the conjugate gradient descent algorithm.

12. The DFE processing method of claim 11, wherein calculating the FFE tap coefficient vector g by solving an equation $(R_{yy}-R_{yx}R_{yx}^{H})g=r_{yx}$ using the conjugate gradient descent algorithm comprises:
(1) initializing a solution $g_0=r_{yx}$, a search direction vector $p_0=r_{yx}$ and a residual vector $r_0=r_{yx}$, and repeating the following steps (2) to (7); wherein a loop variable i=0, 1, 2, . . . , k−1, and k is a maximum iteration number for the conjugate gradient descent algorithm;
(2) calculating $W_1=R_{yy}p_i$, $W_2=R_{yx}^{H}p_i$ and $W_3=R_{yx}W_2$; wherein during the calculation, constructing a circulant matrix for at least one of the input signal autocorrelation matrix $R_{yy}$, the input-output signal cross-correlation matrix $R_{yx}$ and the conjugate transposed matrix $R_{yx}^{H}$ of the input-output signal cross-correlation matrix $R_{yx}$, and constructing an extended column vector for at least one of $p_i$ and $W_2$ corresponding to the circulant matrix; and performing multiplying operation on the circulant matrix and the extended column vector using FFT;
(3) calculating $W=W_1-W_3$;
(4) calculating $A=W^{H}p_i$, wherein $W^H$ is a conjugate transposed matrix of W;
(5) updating a solution $g_{i+1}=g_i+\alpha*p_i$, wherein $$\alpha = \begin{cases} 0, & |A| < thr \\ \dfrac{r_i^H r_i}{A}, & |A| \geq thr \end{cases}$$

and thr: denotes a predetermined threshold value;
(6) caching the residual vector $t_i=r_i$, and updating the residual vector $r_{i+1}=r_i-\alpha*W$; and
(7) updating the search direction vector $p_{i+1}=r_{i+1}+\beta*p_i$, wherein $$\beta = \begin{cases} 0, & |t_i| < thr \\ \dfrac{r_{i+1}^H r_{i+1}}{t_i^H t_i}, & |t_i| \geq thr \end{cases}.$$

13. The DFE processing method of claim 12, wherein performing multiplying operation on the circulant matrix and the extended column vector using FFT in step (2) comprises:
dot multiplying a first column of the circulant matrix with the extended column vector after they are transformed using FFT; and
performing inverse FFT (IFFT) on a multiplying result of the dot multiplying and determining a result of the multiplying operation based on a transformed result of the IFFT.

14. The DFE processing method of claim 11, wherein calculating a FFE tap coefficient vector g and a FBE tap coefficient vector f based on the input signal autocorrelation matrix $R_{yy}$, the input-output signal cross-correlation matrix $R_{yx}$ and the input-output signal cross-correlation vector $r_{yx}$ further comprises:
calculating the FBE tap coefficient vector f by solving an equation $f=-R_{yx}^{H}g$ based on the FFE tap coefficient vector g and the conjugate transposed matrix $R_{yx}^{H}$ of the input-output signal cross-correlation matrix $R_{yx}$.

* * * * *